United States Patent
Joly et al.

(10) Patent No.: US 6,898,713 B1
(45) Date of Patent: May 24, 2005

(54) RESIDUE TRANSFER FOR ENCRYPTED MESSAGES SPLIT ACROSS MULTIPLE DATA SEGMENTS

(75) Inventors: Christophe Joly, Mountain View, CA (US); Rajan Sharma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 09/753,217

(22) Filed: Dec. 28, 2000

(51) Int. Cl.[7] .......................... G06F 11/30; G06F 12/14; H04L 9/32
(52) U.S. Cl. ........................................ 713/193; 713/161
(58) Field of Search ............................... 713/154, 159, 713/192–194, 171; 380/37

(56) References Cited

U.S. PATENT DOCUMENTS 5,349,348 A * 9/1994 Anderson et al. ............. 341/51
6,032,197 A * 2/2000 Birdwell et al. ............. 709/247
2002/0199101 A1 * 12/2002 Krishna et al. ............. 713/161

* cited by examiner

Primary Examiner—Emmanuel L. Moise
Assistant Examiner—A. Sherkat
(74) Attorney, Agent, or Firm—Sierra Patent Group, Ltd.

(57) ABSTRACT

A method and apparatus for processing incomplete SSL/TLS records is disclosed. Typical processing of encrypted and authenticated SSL/TLS records involves reconstructing the entire record after if has been segmented by a transport layer in order to be sent over a networked connection. This creates a significant performance bottleneck. The disclosed invention takes the truncated records as they arrive and creates block-aligned segments (truncated records), coupled with residue left to transfer between an arriving segment and the previously block-aligned segment, which allows continuous processing of the encrypted partial records.

16 Claims, 4 Drawing Sheets

Continual Truncated Record Decryption According To The Present Invention

A Typical Prior Art System Configuration

Continual Truncated Record Decryption According To The Present Invention

NET EFFECT OF USING DISCLOSED INVENTION: BLOCK ALIGNED TRUNCATED RECORDS

RESIDUE TRANSFER FOR ENCRYPTED MESSAGES SPLIT ACROSS MULTIPLE DATA SEGMENTS

BACKGROUND OF THE INVENTION

1. Field of the Invention

This invention pertains generally to security-related features in a computer system. More particularly this invention is directed to a new system and method for decrypting messages that have been transmitted across multiple data segments.

2. The Prior Art

The problems of security in a typical network-based transaction are well known. For each transaction involving private personal or financial data over a public network such as the internet, it is desirable to provide both authentication and privacy of the data as the data goes between two interacting nodes. A typical configuration having a prior art solution to this problem is shown in FIG. 1.

Nodes 100 and 102 are connected through internet cloud 104 to a server system 106. There may be any number of nodes connected to server 106, as indicated by the ellipses between nodes 100 and 102. Server system 106 will typically have at least one machine 108 dedicated to serving requests coming in from internet 104 (for larger installations there may be a gateway and a large set of servers), coupled by an internal network 110 to secondary storage 112, where data resides that will be used to service requests.

Machine 108 will typically be handling transactions requiring security using an SSL or TLS based protocol in its protocol stack. The network protocol stack in machine 108 is shown to the right of a portion of the standard ISO network model. ISO physical layer L1 114 and data link layer L2 116 both map to a set of lower level protocols 126. ISO network layer L3 118 maps to IP layer 128. ISO transport layer L4 120 maps to TCP layer 130. ISO session layer L5 122 maps to session protocol 132, and ISO application layer L6 124 maps to SSL record protocol 134, SSL handshake protocol 136, and the application 138.

The SSL protocols are well known in the art, and involve a session initialization portion which uses the SSL handshaking protocol together with the creation, transmitting, receiving, and decoding of SSL records over a network using the SSL record protocol. After the SSL layers 134 and 136 have done their work, the plaintext messages are sent up the stack to application 138.

SSL records may be up to 16 Kbytes in size. An SSL record corresponds to one authenticated and encrypted piece of data. If the underlying encryption/authentication algorithm is block oriented (such as DES, SHA, MD5 etc), then an SSL record will be in units of the block size required by the encryption algorithm (i.e., if the underlying cipher algorithm is a block cipher using 8 byte blocks, then the SSL record will some multiple of 8 bytes). Otherwise, the SSL records may be any convenient size up to 16 Kbytes where the size is determined by the system creating them.

The system that receives the SSL records has to accept what is sent, and, having no a priori knowledge of the arriving record's length, must always be ready to handle any record size up to and including 16 Kbytes. These varying length SSL records will be sent to the target node in a varying number of TCP segments, also of varying length.

Because the receiving node doesn't know the length of the incoming SSL record which is arriving over a multitude of TCP segments, coupled with the fact that there are decryption dependencies between bytes in a record, receiving nodes have had to reconstruct the entire record before proceeding with decryption. This requirement has lead to a serious bottleneck when attempts have been made to speed up the overall encryption/decryption process. The reconstruction of records from TCP segments, and then the decrypting of the reconstructed records is essentially a sequential process. So far, the reconstruction of the SSL records and then passing them of to be decrypted in a form the decryption engine can understand has been handled by software.

In order to make any significant gain in the speed at which this process can be carried out, a new solution to this bottleneck at the record reconstruction stage must be found. Thus, there is a profoundly felt need to find a new solution to SSL record reconstruction and decryption.

BRIEF DESCRIPTION OF THE INVENTION

The present invention discloses a system and method for enabling the continuous processing of partial SSL records received over a network connection. When an SSL record is constructed by an application layer program, that record is divided up into arbitrary lengths for transport over a network by the transport layer (typically TCP). Prior art solutions have required that the entire SSL record be reconstructed in the receiving node before processing may continue. This has created a significant bottleneck. The present invention shows how it is possible to carry out continuous processing of partial SSL records.

This is accomplished by forcing each partial record (called a truncated record) to be block-aligned. Block-alignment is accomplished by truncating the initial truncated record of an SSL record at a block-aligned byte. The bytes left after this truncation process are called "residue". This residue is stored until the next truncated record that is a part of the same SSL record arrives. The residue is prepended to the newly arrived truncated record. The newly constructed truncated record is now block-aligned, like the first truncated record. Any bytes left over after this block-alignment takes place are the residue from this second truncated record, and are stored for use with the third truncated record. This process continues until the last truncated record for an SSL record arrives, at which point prepending the residue will create a block-aligned truncated record (because the entire SSL record is block-aligned).

After a block-aligned truncated record is created by this method, it may be decrypted without waiting for the other portions of the record to arrive. Note that since creating a block-aligned truncated record is dependent on the residue from the previously created block-aligned truncated record, the block-aligned truncated records will become available to decrypt in the order in which the truncated records were sent.

BRIEF DESCRIPTION OF THE DRAWING FIGURES

DETAILED DESCRIPTION OF PREFERRED EMBODIMENTS

Figure 1:
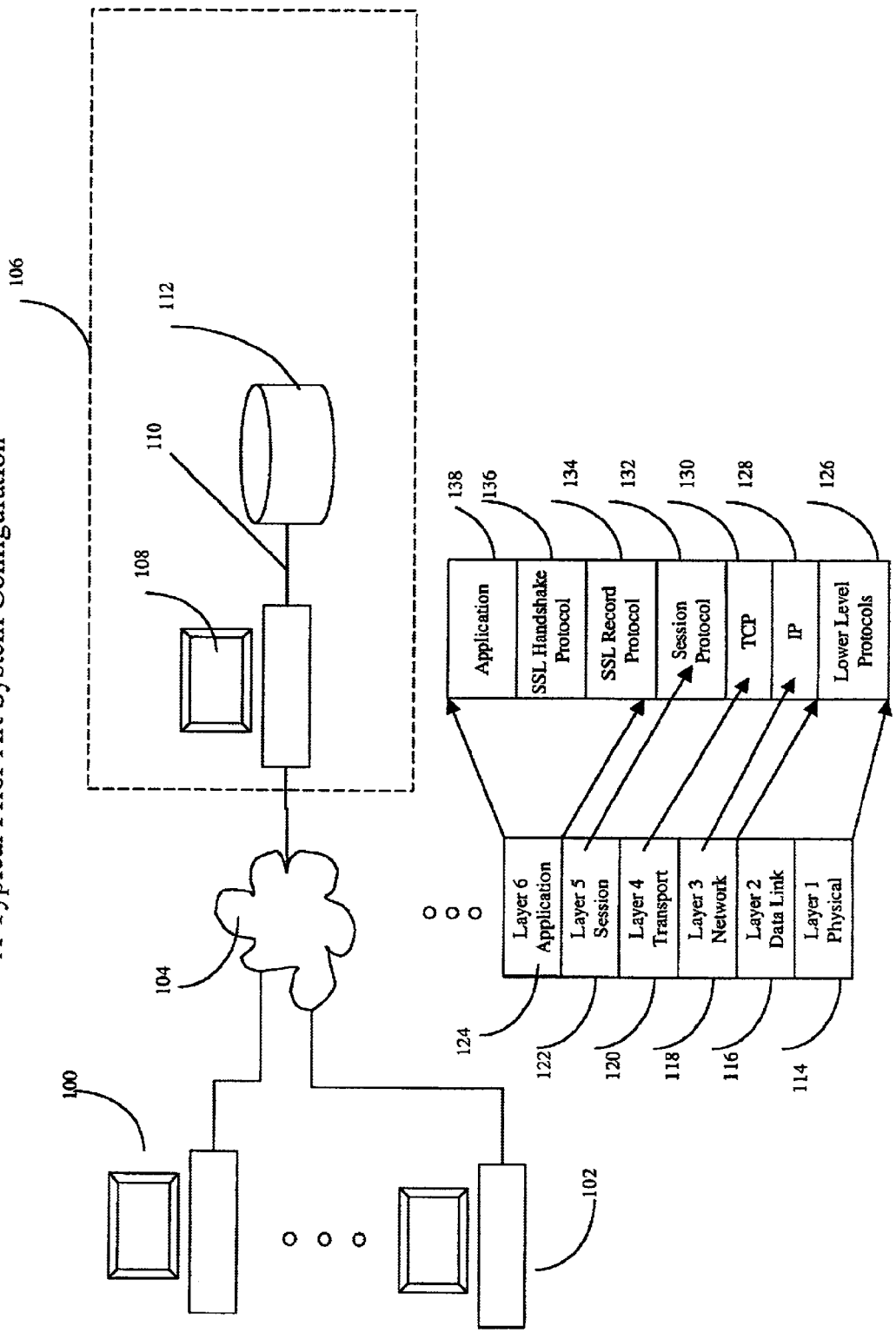
FIG. 1 is a block diagram illustrating a prior art system configuration.

Person of ordinary skill in the art will realize that the following description of the present invention is illustrative only and not in any way limiting. Other embodiments of the invention will readily suggest themselves to such skilled persons having the benefit of this disclosure.

The present invention addresses the need to reduce the bottleneck that occurs when receiving TCP segments that contain only part of an SSL/TLS record. Reconstructing the entire record from record fragments contained in TCP segments (called truncated records) before processing the SSL/TLS record (decrypting and checking authorization) have, in the past, prevented this portion of the process from being implemented in a more parallel manner and from being implemented in hardware. The best and most reliable way to gain significant performance over the existing art is to both increase parallelism in the algorithm and to transfer this functionality into hardware. To meet these goals a better way of dealing with truncated records had to be solved.

In addition to the potential performance gains that can be found from additional parallelism in general, to maximize the benefit of implementing a process in hardware a primary goal is to maximize the available parallelism in any task. Closely related to this is the general issue of using the available real estate in all hardware to enable maximum parallelism, which necessarily involves the use of a large number of internal queues to feed various internal computational units. The number of queues that can be implemented is inversely proportional to the size of each queue element. Thus, the individual queue elements should be kept as small as possible.

It was discovered that in the processing of SSL/TLS records, a maximum individual element processing size in the range of 1.5 Kbytes to 2.0 Kbytes could accommodate a majority of records sent. A minority of records will be larger than that, going up in size to the maximum SSL/TLS record size of 16 Kbytes. Thus, to maximize performance in the new chip a way had to be found to utilize internal elements no larger than 1.5 Kbytes–2.0 Kbytes (rather than 16 Kbytes), otherwise a significant amount of memory space would be lost, therefore reducing the number of queues that can be implemented and the queues' associated ability to enable increased parallelism.

The disclosed invention found a solution to this and related problems by discovering a way to proceed with decryption and authentication processing without the need to reconstruct the original SSL/TLS record. This significantly increases overall parallel processing of incoming SSL records. Truncated records, sent in multiple TCP segments, may be processed as they arrive. This provides for one level of increased parallelism. In addition, the smaller computational elements enables the chip or other hardware designers to utilize queues whose elements are sized at less than the maximum SSL/TLS record size. This enables a second level of increased parallelism within the decryption computational units.

For the purposes of the disclosure, when referring to SSL records it is to be understood that "SSL" also references TLS and similar security protocols.

Figure 2:
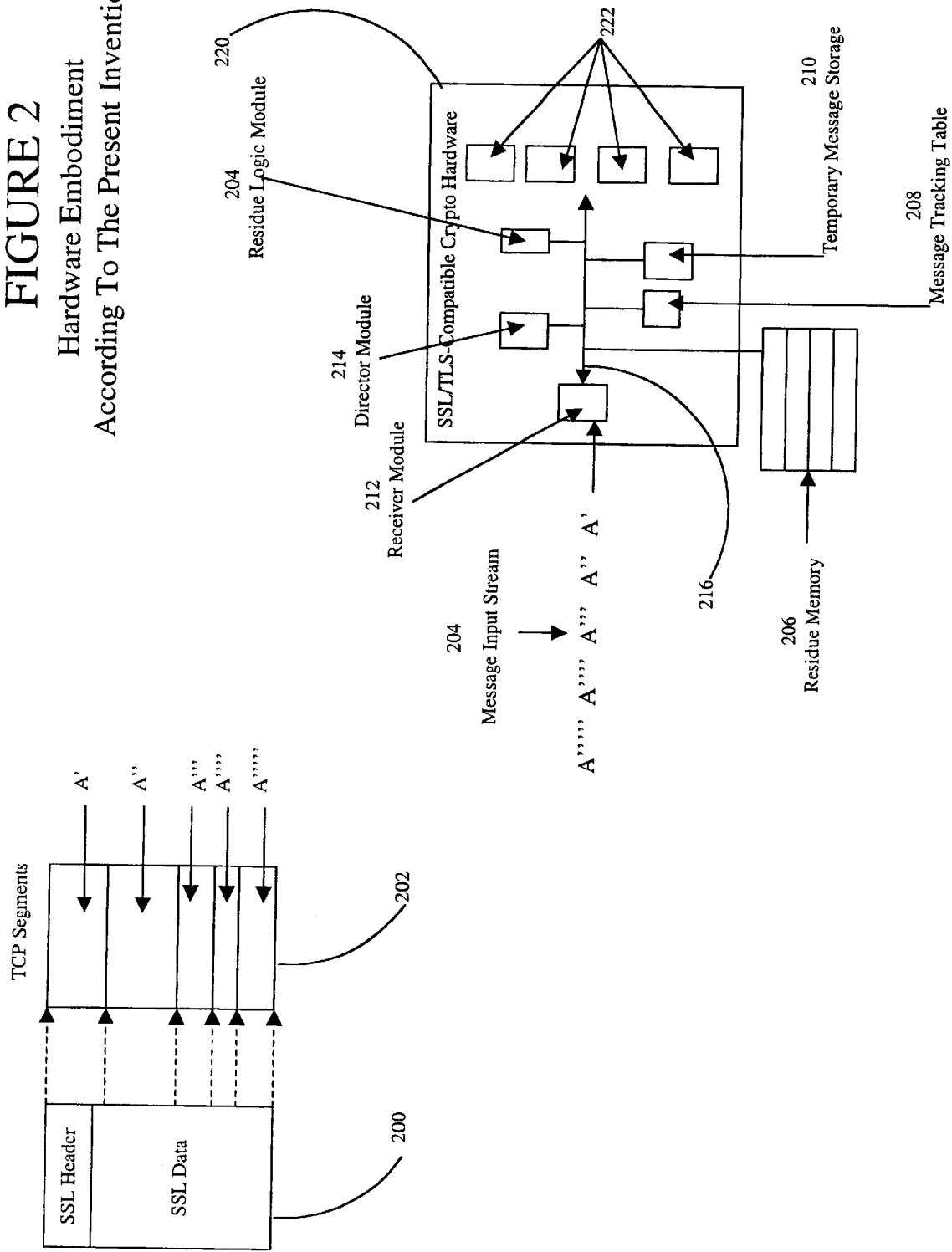
FIG. 2 is a block diagram of a hardware embodiment of the present invention

Going now to FIG. 2, a typical SSL record 200 is shown. When the SSL record containg cipher text is passed to the TCP layer, it is divided up into a plurality of TCP segments. The TCP segments are shown together as 202, with individual segments referenced by A' through A''''. When transported over a network, the segments will arrive in the same order but will be interspersed with other traffic.

For the purposes of this disclosure, the discussion will focus on how an individual SSL record is decrypted, but it will be understood by those with ordinary skill in the art and the benefit of the present disclosure that the disclosed process will be carried out and distributed within the general context of processing multiple records, multiple sessions and multiple connections simultaneously. In addition, because of the current prevalence of the TCP protocol in L4, the transport layer, this disclosure is written using TCP-terms such as TCP segments. As will be understood by one of ordinary skill in the art and with the benefit of the present disclosure, any L4 transport protocol (and any L3 protocol as well) may be used in conjunction with the present invention.

Segments, messages, or truncated records A' through A'''' arrive at crypto hardware module 220 in the order they were sent from the originating node (the ordering is preserved by the transport layer of the network connection). Receiver module 212 stores the incoming message stream, in this case A', in temporary message storage 210. This is the storage used for all messages currently being processed within crypto hardware module 220. Message tracking table 208 keeps track of each message's location in temporary message table 210, as well as other information (both in-band and out-of-band) on each message which is needed to complete processing. Director module 214 directs the flow of the messages currently being processed, interfacing with all the components on crypto hardware module 220 through bus 216. Residue logic module 204 contains the logic required to process SSL truncated records, and is discussed in more detail below. The hardware module (which may be realized in a single chip or a portion of a chip or may have functionality in several pieces of hardware) will contain numerous other modules that carry out known encryption and authentication schemes such as DES, RC4, SHA, MD5, etc., which are shown generally as boxes 222; these boxes are also intended to show the presence of other processing and logic modules within the hardware module not directly related to the current invention.

Residue memory 206 is off-chip (if the hardware module is embodied on one chip) memory used for the temporary storage of the residue from processing a truncated record. This memory is primarily accessed and used by residue logic module 204. In one preferred embodiment the residue memory shown in FIG. 2 may be either dedicated memory or a portion of general purpose DRAM found on the same local bus as cryptographic hardware module 220. Other implementations of the current invention may also include having residue memory 206 on-chip.

Figure 3:
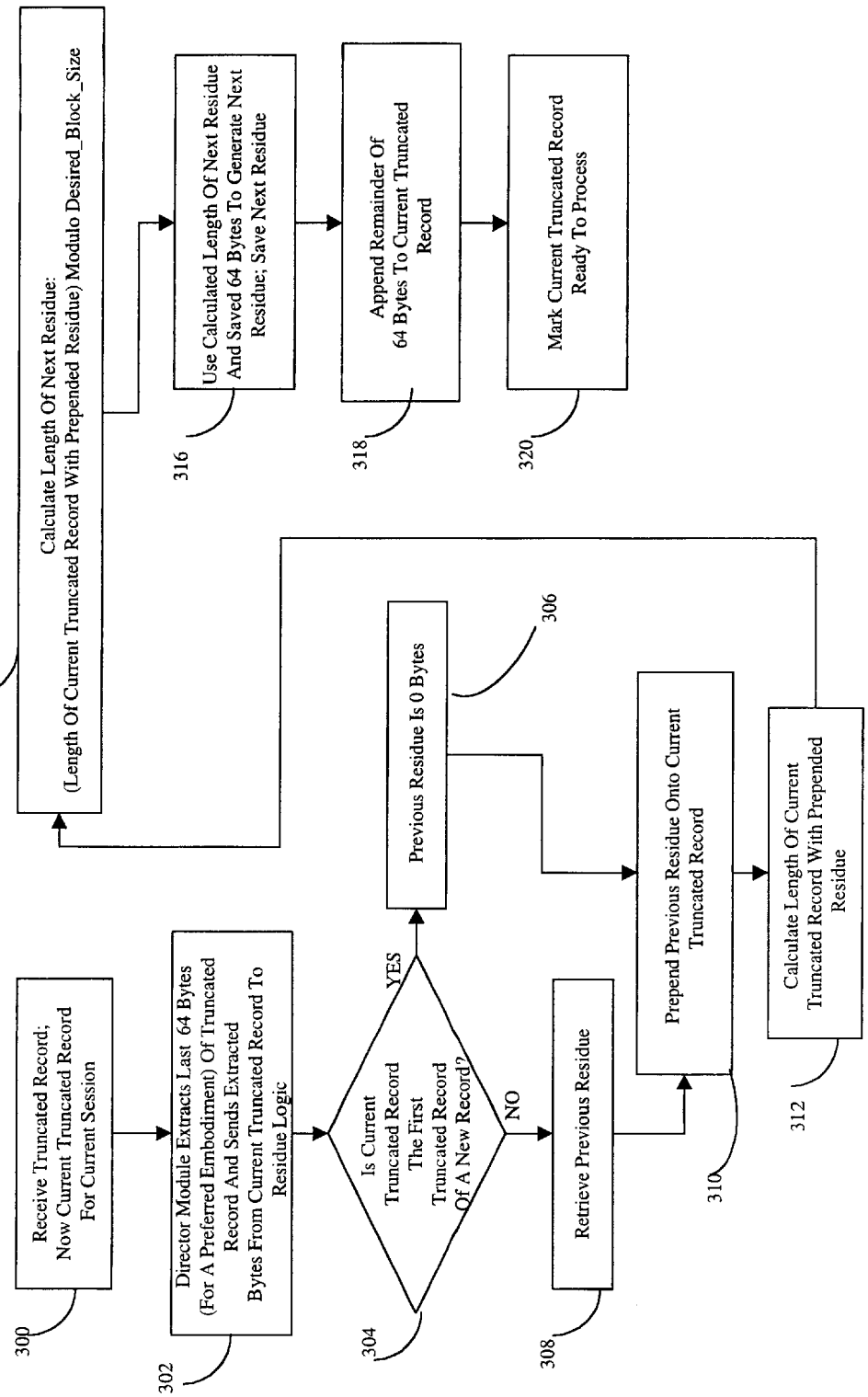
FIG. 3 is a flow chart according to the present invention.

Continuing on to FIG. 3, one preferred method of using the present is illustrated. The first action in box 300 is the reception of a truncated record. Each truncated record will also include other information about itself, including session, connection, and SSL record information. The newly arrived record segment will be considered the current record segment (current truncated record) for the session and connection to which it belongs.

Box 300 is left and box 302 entered. The action taken in box 302 is by the director module, which does two things. First, the director module extracts the last 64 bytes and saves them aside for use by the residue logic module. 64 bytes is extracted due to one preferred embodiment in which 64 bytes is the maximum possible residue length. Other lengths may be chosen; ways of choosing other lengths will be described below.

The director module then stores the truncated record in memory, where the truncated record will be kept until processing on it has been completed. Box 302 is left and decision point 304 entered.

Decision point 304 checks to see if this current truncated record is the first truncated record of a new SSL record. If it is the first truncated record of a new SSL record, then the "YES" exit is taken and box 306 is entered.

The action taken in box 306 is to set the previous residue to 0. Box 306 is the left for box 310.

Returning to decision point 304, if the current truncated record is not the initial truncated record of a new SSL record, then the "NO" exit is taken to box 308. The action taken in box 308 is to retrieve the residue from the previously processed truncated record which is a part of the same SSL record as the current truncated record. Box 308 is left and box 310 is entered.

The action taken in box 310 involves prepending the retrieved residue on to the current truncated record. In the case where this is the first truncated record of a new SSL record, that will be nothing (0 bytes from box 306). Box 310 is left and box 312 entered. The action taken in box 312 is to calculate the length of the current truncated record including the prepended residue. Continuing on from box 312 to box 314, the length of the next residue is calculated. This is a single modulo operation taken on the just calculated length of the current truncated record prepended with the previous residue, and using a desired_block_size as the base.

For currently popular encryption/decryption and authentication algorithms, the desired_block_size will be 64 bytes. The block size is determined from the encryption/decryption and authentication algorithms being implemented in the crypto hardware module. Such algorithms include DES, 3DES, SHA, MD 5, etc. These algorithms operate on blocks of bytes rather than a continuous byte stream. The desired_block_size is the smallest block size all the algorithms can operate on, defined as the lowest number that is a positive integer multiple of the block size on which each algorithm operates. In one preferred embodiment there may be DES, 3DES, SHA, and MD 5. SHA and MD 5 operate on 64 byte blocks; DES and 3DES operate on 8 byte blocks. In this case the desired_block_size is 64 bytes. The desired_block_size is also used to determine how many bytes to extract from the end of the incoming current truncated record, shown in box 302. In the illustrated preferred embodiment both are 64 bytes; if a new desired_block_size is determined for use in another implementation, then the number of bytes extracted in box 302 will be changed to match it.

After the length of the next residue is calculated in box 314, the process continues in box 316. In box 316 the length of the next residue (which was in bytes) is used to extract that number of bytes from the end of the 64 bytes earlier extracted from the current truncated record. This is the new residue. The new residue is stored as the current truncated record's residue, and will be prepended to the next truncated record that arrives and is a part of this SSL record.

Continuing with box 318, the portion of the 64 bytes that was not taken for the new residue is appended back onto the current truncated record. This has the effect of creating block-aligned truncated records, and in the case of one preferred embodiment it creates 64-byte block aligned truncated records. Once block aligned, the decryption and authentication algorithms may be used. This is shown as the final box in the method flow, box 320, where the now block-aligned truncated record is ready to be further processed by the cryptographic modules found in the crypto hardware module. The system will indicate in some way that this truncated record may now be processed. Such an indication may take any number of forms well known in the art, from setting a single bit to a change in its memory location, to assignment to a specified internal queue. And the processing may commence immediately; there is no need to wait and reconstruct an entire SSL record before proceeding.

As will be readily apparent to one of ordinary skill in the art and with the benefit of the present disclosure, there can be many variations and ways of implementing the just described method and algorithm while staying fully within the inventive concept revealed. For example, the last 64 bytes may be copied rather than extracted from an incoming truncated record, meaning that when the process arrives at box 318 the truncated record is reduced in size by the length of the next residue calculated in box 314, rather than having the remainder of the 64 bytes previously extracted being appended back on to the truncated record. That, and many other permutations, will come readily to mind.

Figure 4:
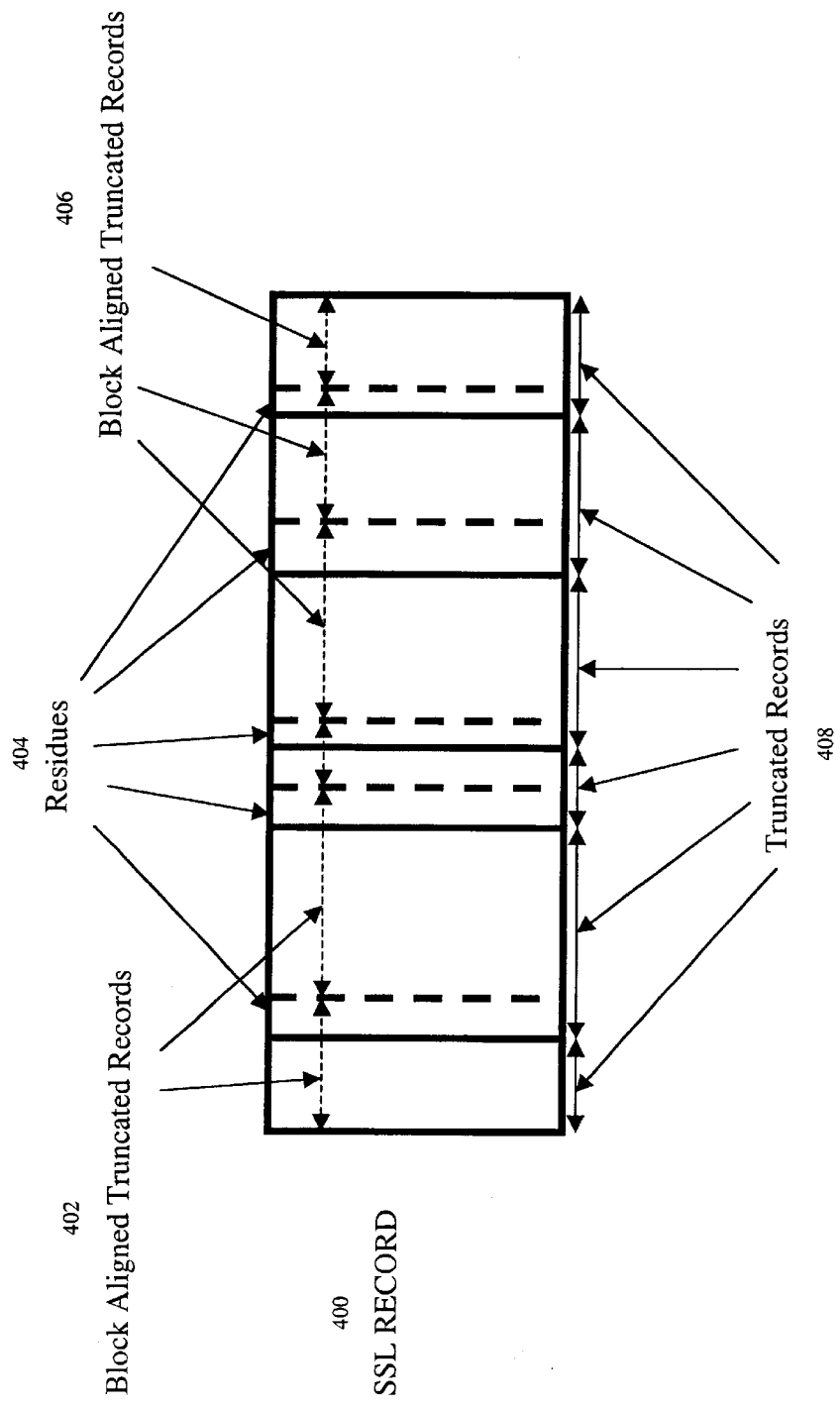
FIG. 4 is a block diagram showing the effects of the present invention on an SSL record.

The effect of the method just described is shown generally in FIG. 4. By using the concept of residue and then saving the residue from one truncated record for use with the next incoming truncated record (when both are part of the same SSL record), the effect is to block-align the truncated records. Block aligning the truncated records allows decryption and authentication processing to take place on each truncated record, rather than needing to wait until an entire SSL record is recreated. This allows smaller segments inside the crypto hardware module to be used, which enables increased parallelism and increased processing speed.

FIG. 4 shows an SSL record 400 that has been divided into truncated records 408. The truncation occurs in the TCP layer of the network protocol stack (or other similar transport protocol), resulting in non-block aligned records. Note that the overall length an SSL record which uses a block cipher is always block aligned, because the encrypting algorithm will always pad out a shorter message to the required length. The heavy, solid lines show the boundaries of the non-block-aligned truncated records.

There will be a residue associated with each truncated record except the last. The last truncated record will be block aligned after prepending the residue from the previous truncated record. The residues are pointed to by 404; they are the bytes lying between the heavy solid line and the heavy dotted line immediately to the heavy solid line's right. Using residues as discussed above results in the creation of block-aligned truncated records, pointed to by 402 and 406 (and one additional block-aligned truncated record in the middle not having a pointer).

The general process of the invention is to transfer the residue from the previous truncated record to the next one, calculate a new block-aligned truncated record size using the prepended truncated record length, remove the excess length over the block-aligned portion from the current truncated record with prepended residue, use the removed excess length as the residue to use on the next arriving truncated record, which creates block-alignment in all the truncated records that comprise a particular SSL record.

One preferred embodiment of the present invention is to implement as much of the described functionality in hardware as possible. However, as will be recognized by a person of ordinary skill in the art and with the benefit of the present disclosure, there are performance enhancements that could be made to existing hardware platforms using software implementations of the inventive algorithms just described. These enhancements are based on the creation of block-aligned truncated records by software, which would enable a legacy hardware base to start processing portions of an SSL record immediately rather than having to wait until all the SSL record segments arrived over the net and are reconstructed into a single SSL record. All such embodiments are fully contemplated as being within the inventive scope of the present disclosure.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. In a data processing system having a cryptographic hardware module and residue memory, a method for processing truncated records comprising:

(a) receiving a truncated record in said cryptographic hardware;

(b) determining if there is a residue associated with said truncated record;

(c) retrieving said associated residue from said residue memory if there is a residue associated with said truncated record;

(d) modifying said truncated record if there is a residue associated with said truncated record;

(e) saving any bytes left over from said modification in residue memory and associating said left over bytes for use with a next truncated record that is associated with said modified truncated record, creating a residue associated with said a next truncated record thereby; and, (g) indicating said modified truncated record is ready for further processing.

2. The method of claim 1 where said cryptographic hardware module is embodied in a single chip.

3. The method of claim 1 where said cryptographic hardware module and said residue memory are embodied in a single chip.

4. The method of claim 1 where steps (b) and (c) further comprise:

associating a residue value of 0 to said truncated record if said truncated record is a first truncated record associated with an SSL record and saving said associated residue value in said residue memory; and, retrieving said truncated record's associated residue from said residue memory.

5. The method of claim 1 where steps (d) through (f) further comprise:

prepending said retrieved associated residue onto said truncated record creating an interim truncated record thereby;

performing a modulo operation on said interim truncated record according to said residue logic module;

truncating said interim truncated record according to said modulo operation creating a modified truncated record that is block aligned thereby;

associating any truncated bytes left from truncating said interim truncated record with a next truncated record and saving said truncated bytes in said residue memory, creating residue associated with said next truncated record thereby; and, associating 0 bytes as the residue for a next truncated record except if said modified truncated record is a last record of an SSL record in which case no residue is associated.

6. A data processing system comprising:

a residue memory;

a cryptographic hardware module further having a residue logic module operably disposed therein, where said residue logic module is operably connected to said residue memory and where said cryptographic hardware module is further configured to receive network-originated truncated records; and, a truncated record management system disposed within said cryptographic hardware module and said residue logic module, configured to receive said network-originated truncated records, modify said network-originated truncated records using any associated residue and in accordance with block-alignment information disposed within said residue logic module, and save any resulting residue in a manner so as to correctly associate said residue with corresponding network-originated truncated records.

7. The system of claim 6 where said cryptographic hardware module is on an single chip.

8. The system of claim 6 where said cryptographic hardware module and said residue memory are embodied in a single chip.

9. A data processing system for processing truncated records comprising:

means for receiving a truncated record in said cryptographic hardware;

means for determining if there is a residue associated with said truncated record;

means for retrieving said associated residue from said residue memory if there is a residue associated with said truncated record;

means for modifying said truncated record if there is a residue associated with said truncated record;

means for saving any bytes left over from said modification by said residue logic module in residue memory and associating said left over bytes for use with a next truncated record that is associated with said modified truncated record, creating a residue associated with said a next truncated record thereby; and, means for indicating said modified truncated record is ready for further processing.

10. The system of claim 9 where said cryptographic hardware module is embodied in a single chip.

11. The system of claim 9 where said cryptographic hardware module and said residue memory are embodied in a single chip.

12. The system of claim 9 further comprising:

means for associating a residue value of 0 to said truncated record if said truncated record is a first truncated record associated with an SSL record and saving said associated residue value in said residue memory; and, means for retrieving said truncated record's associated residue from said residue memory.

13. The system of claim 9 further comprising:

means for prepending said retrieved associated residue onto said truncated record creating an interim truncated record thereby;

means for performing a modulo operation on said interim truncated record according to said residue logic module;

means for truncating said interim truncated record according to said modulo operation creating a modified truncated record that is block aligned thereby;

means for associating any truncated bytes left from truncating said interim truncated record with a next truncated record and saving said truncated bytes in said residue memory, creating residue associated with said next truncated record thereby; and, means for associating 0 bytes as the residue for a next truncated record except if said modified truncated record is a last record of an SSL record in which case no residue is associated.

14. A program storage device readable by a machine, tangibly embodying a program of instructions executable by a machine for processing truncated records where the truncated records contain cipher text, the method comprising:

(a) receiving a truncated record in said cryptographic module;

(b) determining if there is a residue associated with said truncated record;

(c) retrieving said associated residue if there is a residue associated with said truncated record;

(d) modifying said truncated record using said associated residue according to said residue logic module, if there is a residue associated with said truncated record;

(f) saving any bytes left over from said modification by said residue logic module and associating said left over bytes for use with a next truncated record that is associated with said modified truncated record, creating a residue associated with said a next truncated record thereby; and, (g) indicating said modified truncated record is ready for further processing.

15. The method of claim 14 where steps (b) and (c) further comprise:

associating a residue value of 0 to said truncated record if said truncated record is a first truncated record associated with an SSL; and, retrieving said truncated record's associated residue value.

16. The method of claim 14 where steps (d) through (f) further comprise:

prepending said retrieved associated residue onto said truncated record creating an interim truncated record thereby;

performing a modulo operation on said interim truncated record according to said residue logic module;

truncating said interim truncated record according to said modulo operation creating a modified truncated record that is block aligned thereby;

associating any truncated bytes left from truncating said interim truncated record with a next truncated record, creating residue associated with said next truncated record thereby; and, associating 0 bytes as the residue for a next truncated record except if said modified truncated record is a last record of an SSL record in which case no residue is associated.

* * * * *